INFRA-RED SENSITIVE PHOTOCONDUCTIVE CELL

Filed June 8, 1954 6 Sheets-Sheet 1

INVENTORS
YVES A. ROCARD
BERNARD E. BARTELS
BY Strauch, Nolan & Diggins
ATTORNEYS INVENTORS
YVES A. ROCARD
BERNARD E. BARTELS
BY Strauch, Nolan & Diggins
ATTORNEYS

INFRA-RED SENSITIVE PHOTOCONDUCTIVE CELL

Filed June 8, 1954 6 Sheets-Sheet 3

REGION A REGION B

INVENTORS
Yves A. Rocard
Bernard E. Bartels
Strauch, Nolan & Diggins
ATTORNEYS

INVENTORS
YVES A. ROCARD
BERNARD E. BARTELS
BY Strauch, Nolan & Diggins
ATTORNEYS Oct. 24, 1961 Y. A. ROCARD ET AL 3,005,970

INFRA-RED SENSITIVE PHOTOCONDUCTIVE CELL

Filed June 8, 1954 6 Sheets-Sheet 5

INVENTORS
YVES A. ROCARD
BERNARD E. BARTELS

BY Strauch, Nolan & Diggins

ATTORNEYS

INVENTORS
YVES A. ROCARD
BERNARD E. BARTELS
BY Strauch, Nolan & Diggins
ATTORNEYS United States Patent Office 3,005,970
Patented Oct. 24, 1961

3,005,970

INFRA-RED SENSITIVE PHOTOCONDUCTIVE CELL

Yves A. Rocard, Paris, France, and Bernard E. Bartels, Gleenwood Landing, N.Y., assignors, by mesne assignments, to Hupp Corporation, Cleveland, Ohio, a corporation of Virginia Filed June 8, 1954, Ser. No. 435,248
4 Claims. (Cl. 338—18)

This invention relates to methods and means for detecting infra-red radiation, and more particularly to infra-red sensitive photoconductive cells having optimum spectral response in the range of best atmospheric infra-red transparency and to methods of producing such photoconductive cells.

This application is a continuation-in-part of our copending application Serial No. 395,168, filed November 30, 1953, now Patent No. 2,884,345.

The detection at great distances of targets and other objects by means of the infra-red radiant energy emitted or reflected thereby depends primarily on the extent to which the atmosphere is transparent to such radiation, since only those portions of the infra-red radiation not absorbed by the atmosphere can reach the detector. According to the British Admiralty report of September 22, 1950, "Atmospheric Transparency in the 1–14 Micron Region," and other reports, the atmosphere is at least partially transparent to infra-red radiation of wavelengths between 2.0–2.5 microns, 3.5–4.1 microns, 4.5–5.0 microns and 8–12 microns, but all infra-red radiation which does not fall within these wavelengths is substantially entirely absorbed by the carbon dioxide and moisture normally present in the atmosphere. The transparency at 2.0–2.5 and 4.5–5.0 microns is relatively poor, the best transparency (least amount of infra-red energy filtering due to the carbon dioxide and moisture in the atmosphere) being at 3.5–4.2 and 8–12 microns. These wavelength bands of highest atmospheric transparency are often termed "atmospheric windows."

It is essential that the spectral response of infra-red receivers be matched to these "windows" if any degree of efficiency is to be obtained therefrom when employed for detection of targets and other objects particularly when distantly spaced in the atmosphere. Accordingly, it is the primary purpose of the present invention to provide new and and improved photocells which have spectral response characteristics satisfying this requirement and which therefore are particularly adapted to use in devices for the detection of infra-red emitting or reflecting targets and the like in atmospheric environments.

It is, therefore, one of the fundamental objects of this invention to provide novel methods and means for matching the spectral response of infra-red sensitive photoconductive cells to the infra-red transparency of the atmosphere.

Another major object of this invention is the provision of new and improved methods and means for shifting the spectral response of evaporated layer type photoconductive cells so as to extend such response to wavelengths to which the atmosphere is relatively transparent.

It is also an important object of the invention to provide novel methods and means for the detection of relatively cool bodies in an atmospheric environment wherein the moisture and/or carbon dioxide content is relatively high.

A further object of the invention is the provision of new and improved methods for the production of photocells having optimum spectral response in the range of maximum atmospheric transparency to infra-red.

Another object is the provision of new and improved lead sulfide photocells having novel cooling means effective to shift the spectral response of the photocells to the range of maximum atmospheric infra-red transparency.

Still another object of the invention is the provision of new and improved photocells in which background noise due to impingement of ambient radiation on the cells is minimized and cell signal-to-noise ratio thus improved.

It is also an object of this invention to provide new and improved methods of producing photocells having improved response to infra-red radiation, together with improved stability, high sensitivity, high signal-to-noise ratio and low time constant.

These and other objects, features, and advantages of the present invention will become more fully apparent by reference to the appended claims and the following detailed description when read in conjunction with the accompanying drawings wherein:

FIGURE 9 shows, by way of curves, the spectral response of an evaporated layer lead sulfide photocell and lead selenide cell operating at —80° C.;

Figure 14:
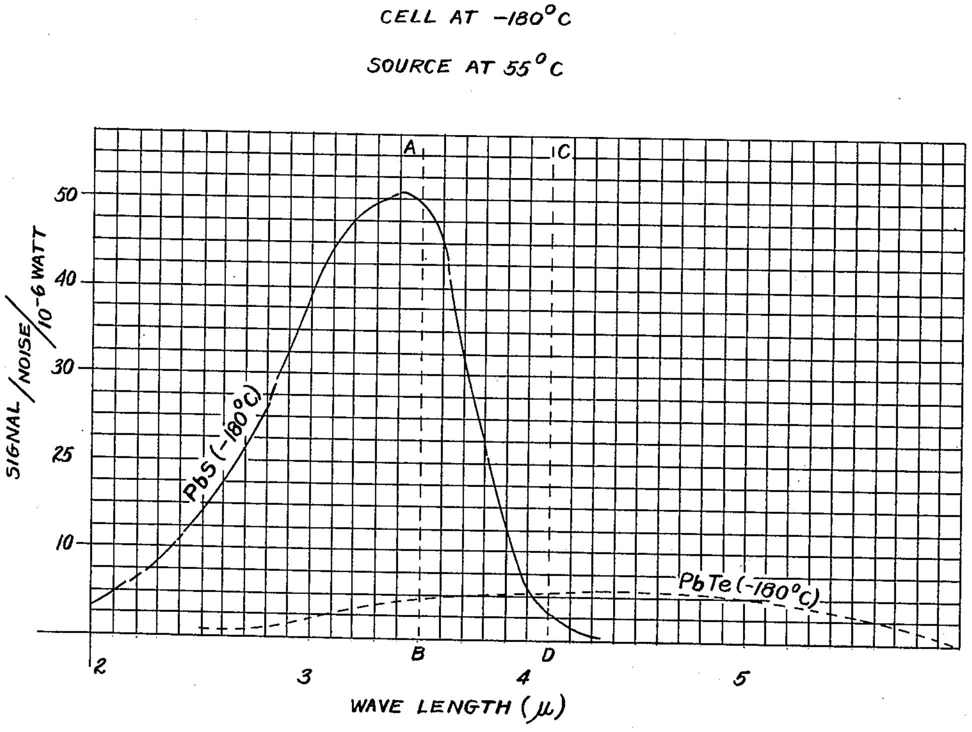
Figure 13:
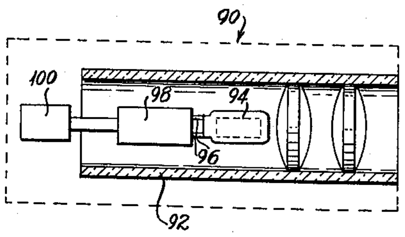

FIGURE 13 is a diagrammatic showing of a sensing device in a guided missile employing a cooled infra-red sensitive photocell with its optimum spectral response in the range of maximum atmospheric infra-red transparency; and FIGURE 14 shows, by way of curves, the relative spectral response of a lead telluride photocell and a lead sulfide photocell operating at —180° C. and detecting a source at 55° C.

Figure 1:
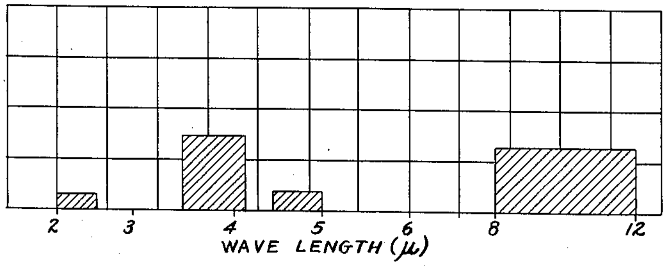
FIGURE 1 is a chart showing the areas of atmospheric transparency to infra-red energy.

In FIGURE 1, the graphical representation of the atmospheric "windows" illustrates that the highest atmospheric transparency is to infra-red radiation of wavelengths between 3.5–4.1 microns and between 8–12 microns. There is also some small transparency between 2.0–2.5 microns and 4.5–5.0 microns. This variation in transparency of the atmosphere to infra-red radiation is largely due to the fact that the moisture and carbon dioxide normally present in the atmosphere exhibit selective absorption of radiation of different wavelengths within the infra-red portion of the spectrum, the absorption characteristics of these gases combining to cause the "window" phenomenon illustrated.

Since moisture and carbon dioxide are everywhere present in the atmosphere, it is essential that infra-red photocells used for detection of distantly spaced objects be responsive to radiation of wavelengths within one or more of the "atmospheric windows" if they are to receive detectable quantities of infrared radiant energy from such distant objects. This is particularly true where the photocells are to be used at low altitudes or adjacent large bodies of water, because carbon dioxide and moisture normally are present in relatively high concentration in the atmosphere at such locations.

It is important to note that an indication of the absolute response of a photocell has little or no valve in determining whether or not the cell will perform satisfactorily in actual service. More important to this determination are the signal-to-noise ratio of the cell and the minimum radiant energy necessary to attain this ratio under service conditions. The relationship between signal-to-noise ratio and impinging radiant energy (in microwatts) may be expressed as a function of wavelength as follows:

$$\text{Signal/noise } 10^{-6}\text{watt}=F(\lambda)$$

The results obtained by use of the above formula are not in accordance with experimental data unless background noise is taken into consideration. Part of this background noise is caused by the photocell itself. Cell noise can be controlled to some extent by the bandpass of the amplifier used, as well as by correct placement of components, proper shielding and the like which contribute to a reduction of the background noise from the cell. Cell noise may be further minimized by judicious selection of the frequency at which the incident radiation is interrupted by the chopping disc or other pulsing device normally interposed between the photocell and the radiant energy source. We have observed that cell noise is substantially inversely proportional to the frequency at which the radiation is pulsed by the chopping device. While this would suggest the use of relatively low chopping frequencies, the signal output of the cell may become undesirably small if chopping frequency is made excessively low. Chopping frequencies of the order of 800 c.p.s. have been found to yield optimum signal-to-noise ratio with the lead sulphide cells of this invention.

While every effort should be made to reduce background noise originating in the cell itself, "exterior" background noise usually has a far more important effect on the effective signal-to-noise ratio of the photocell. This noise results from the fact that the cell is exposed not only to the infra-red radiation from the object being detected but also to radiation of infra-red and other wavelengths emitted or reflected by other objects in the environment in which the detector is operated. In many cases the temperature of the object being detected is but slightly higher than the ambient temperature of its surroundings or of those of the photocell, and in such cases this ambient radiation may partially or even completely obscure the radiant energy emitted by the object being detected.

We have found that "exterior" background noise is dependent on the range of spectral response of the photocell as well as on the difference between object and ambient temperatures, and that optimum signal-to-noise ratio and output response are obtainable with cells having a spectral response within the 3.5–4.1 micron atmospheric "window." The superiority of this particular wavelength range may readily be seen from the experimental data shown graphically in FIGURES 2–5.

Figure 2:
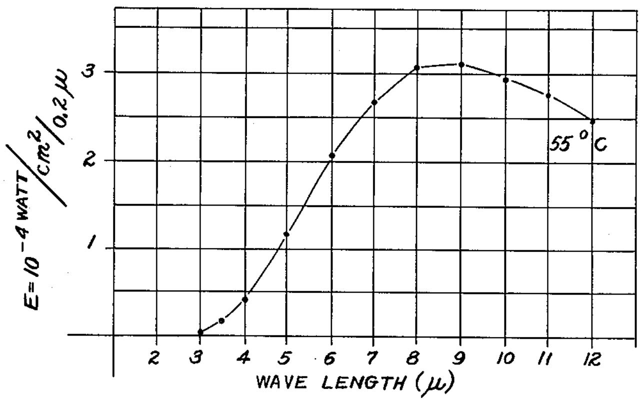
FIGURE 2 shows, by way of a curve, the spectral distribution of radiant energy emitted by a body heated to 55° C.

FIGURE 2 shows the curve of spectral distribution of the infrared output of an object at 55° C. where the output energy (E) is given in units of $10^{-4}$ watt/cm.$^2$/0.2$\mu$.

It will be noted that the object radiates a great deal of infra-red energy between 8–12 microns, which is a good atmospheric "window" as shown on the chart of FIGURE 1, and that the energy radiated between 3.5–4.1 microns appears to be very much less. It is necessary, however to deduct the background noise caused by the "external" impinging infra-red radiation due to the only slightly lower ambient temperature of the cell environment.

Figure 3:
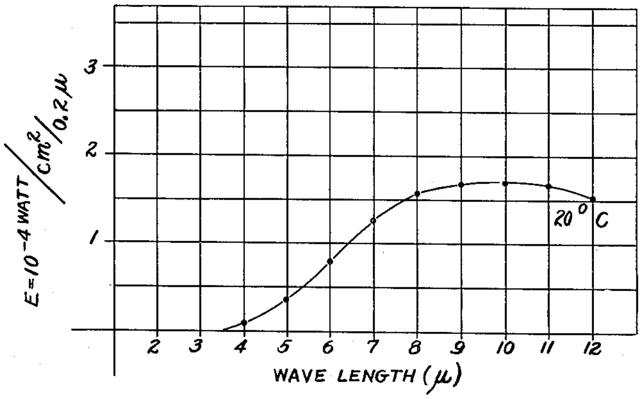
FIGURE 3 shows, by way of a curve, the spectral distribution of infra-red energy emitted by a body at 20° C.

FIGURE 3 shows the spectral distribution of infra-red energy at an ambient temperature of 20° C., the energy (E) being given in $10^{-4}$ watt/cm.$^2$/0.2$\mu$. In order to determine the contribution of ambient temperature to the background noise, it is important to understand that the infra-red radiation of the cell environment at 20° C. acts on the receiver with a maximum solid angle ($2\pi$). The chopping device used with the cell converts the full solid angle into noise because the infra-red radiation from the chopping device itself will impinge on the cell whenever it is in position to block the radiation from the body being detected. The full integral of the ambient temperature may therefore be subtracted, as noise, from the signal of the body being detected. Also, since there are always ambient temperature fluctuations, there will inevitably be additional noise in the cell. This external noise is important because radiant energy emission of a body at 55° C. is relatively small and the ambient infra-red radiation therefore has a substantial effect tending to block out the radiant energy signal from the 55° C. body.

Figure 5:
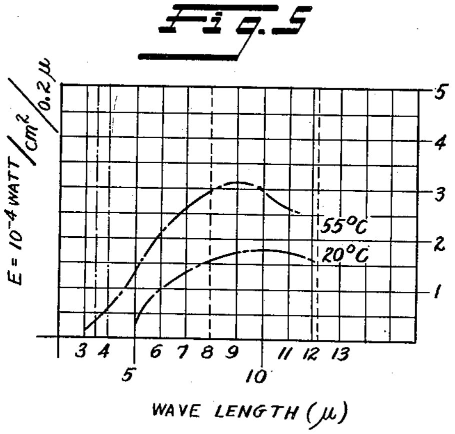
FIGURE 5 shows, by way of curves, the spectral distribution of infra-red radiant energy emitted from a body at 55° C. and of that from a body at 20° C., between 8 and 12 microns.
Figure 4:
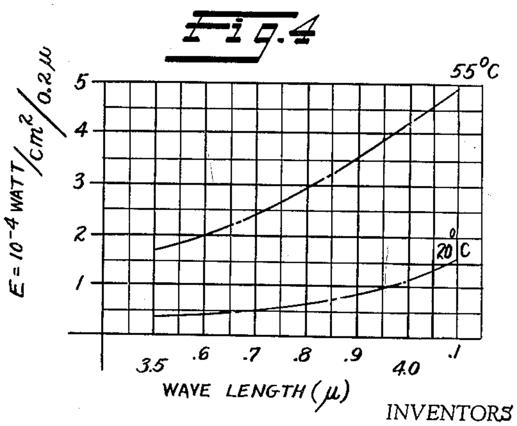
FIGURE 4 shows, by way of curves, the spectral distribution of infra-red energy emitted by a body at 55° C. and of that emitted by a body at 20° C., between 3.5 and 4.1 microns.

FIGURES 2 and 3 present the two curves of radiant energy emission at 55° C. and 20° C. in linear form so that the respective infra-red outputs can be observed directly. Only the quantity of infra-red emission from the 55° C. body which is over and above that due to the 20° C. ambient temperature will be effective to cause the photocell to respond. Cell response therefore will be determined by the difference between the radiant energy emissions at the different temperatures 20° C. and 55° C., and the cell signal-to-noise ratio due to the 20° C. ambient temperature "noise" will be substantially equal to the ratio of the different radiant energy emissions integrated over any selected wavelength range. FIGURES 4 and 5 show how this signal-to-noise ratio determination may be made from curves showing radiant energy emission at the particular temperatures and in the particular wavelength ranges required for detection of relatively cool (55° C.) bodies in atmospheric environments.

FIGURE 4 shows by way of curves the amount of infra-red energy emitted from a 55° C. body and from a 20° C. body between 3.5–4.1 microns, where the energy (E) is given in $10^{-4}$ watt/cm.$^2$/0.2$\mu$. Upon integrating the two values, we find that the ratio is:

$$\frac{\int_{\lambda=3.5\mu}^{\lambda=4.1\mu} E_{55^0}}{\int_{\lambda=3.5\mu}^{\lambda=4.1\mu} E_{20^0}}=3.5$$

FIGURE 5 shows by way of curves the amount of infra-red energy emitted from a body at 55° C. and from a body at 20° C. between 8–12 microns, the energy (E) being given in the same units as in FIGURE 4. Upon integration of the two values, we find that the ratio is:

$$\frac{\int_{\lambda=8\mu}^{\lambda=12\mu} E_{55^0}}{\int_{\lambda=8\mu}^{\lambda=12\mu} E_{20^0}}=1.6$$

From these equations it can readily be seen that a photocell responsive to wavelengths within the band from 3.5 to 4.1 microns has an external noise ratio less than half as great as a cell operating in the band from 8 to 12 microns. It follows that the signal-to-noise ratio for the 3.5–4.1 micron atmospheric "window" is more favorable than that for the 8–12 micron "window"; this despite the fact that as shown in FIGURE 2 a greater proportion of the radiant energy emitted by a body at 55° C. falls within the 8–12 micron "window" than falls within the 3.5–4.1 micron one.

Figure 6:
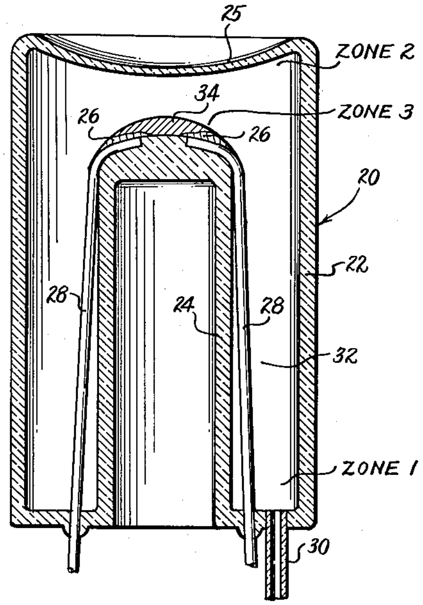
FIGURE 6 is a sectional view of an infra-red sensitive photocell.

Accordingly, photocells having good spectral response at wavelengths within this 3.5–4.1 micron atmospheric "window" are best suited for use in the detection of bodies distantly spaced in the atmosphere. The evaporated layer lead sulfide photocells disclosed in our copending application Serial No. 395,168, referred to above, satisfy this spectral response requirement when properly cooled to about −180° C., which is approximately the temperature of liquid air. A photocell of this type is illustrated in FIGURE 6, the photocell shown having been produced in accordance with the methods disclosed in our said copending application. For sake of brevity, only certain of the steps of this method are given herein and reference is made to said copending application for the additional steps and details of the method disclosed therein.

As shown in FIGURE 6, the cell body 20 includes a glass outer envelope 22 and an inner thimble 24 fused together to form an integral assembly, the cell being closed by an inwardly indented window 25 and provided with a pair of electrodes 26 each having a lead wire 28 extending to the exterior of the cell. A small tube 30 opening into the generally annular chamber 32 defined by thimble 24 and envelope 22 may be provided for use in charging the necessary materials into the cell and for evacuating the cell. This tube is removed and the opening therefor sealed upon completion of the cell.

The preferred method of producing the lead sulfide sensitive area 34 within the cell is as follows:

Lead sulfide powder for use in producing the photosensitive layer should first be prepared, preferably by one of the methods disclosed in said copending application Serial No. 395,168. For example, in a wet method of lead sulfide preparation, purified hydrogen sulfide is passed into a 1 molar solution of lead nitrate or lead acetate or the like. The pH of this solution will be approximately 5.55 for the lead acetate and 3.10 for the lead nitrate. Preferably the amount of hydrogen sulfide used is calculated so that no more than about one-third of the lead salt present in the solution will combine with the hydrogen sulfide to form a precipitation of lead sulfide. The undesirable impurities are precipitated in this first step. The solution is filtered and this first precipitation is discarded. The concentration of lead salts of this solution will then be about two-thirds molar and will have a pH of about 5.59 for lead acetate and 3.32 for lead nitrate. Hydrogen sulfide is again introduced in the manner and quantity described above and the lead sulfide produced from the second precipitation is filtered and dried. The second precipitation contains the least impurities and is acceptable for use in the production of infrared sensitive layers. The remaining solution will have a lead salt concentration of one-third molar and a pH of approximately 5.70 for the lead acetate and 3.70 for the lead nitrate. This remaining solution is discarded because the remaining unprecipitated lead salts contain undesirable impurities which interfere with the photosensitivity of the final product.

A dry method for preparing the lead sulfide has the advantage of yielding a moisture free product, and in this method purified metallic lead is evaporated into an atmosphere of hydrogen sulfide. A vacuum furnace or muffle furnace can be used. The lead sulfide powder is collected and placed in a dessicator until required. Another method of preparing dry lead sulfide powder is to react purified lead metal with purified sulfur in stoichiometric proportions in a vacuum. The resultant product is collected and stored in a dessicator.

Figure 7:
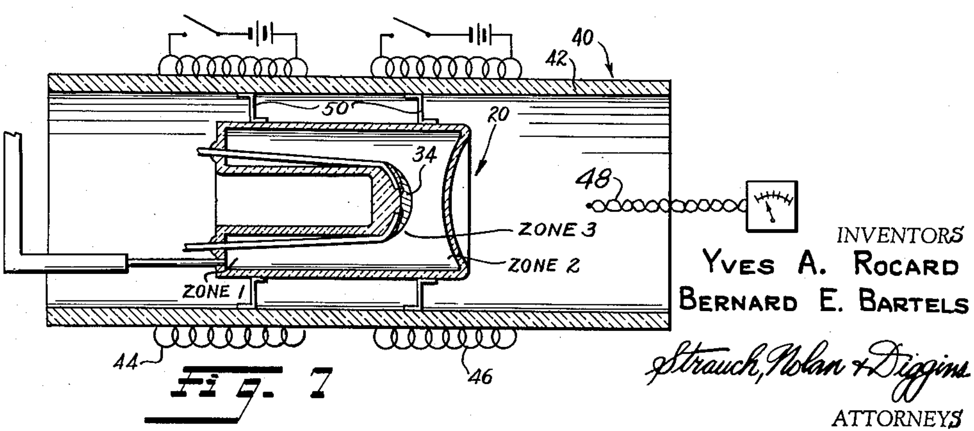
FIGURE 7 is a plan view of an electric oven, and shows heating zones and a photosensitive cell in the heating zones.
Figure 3:
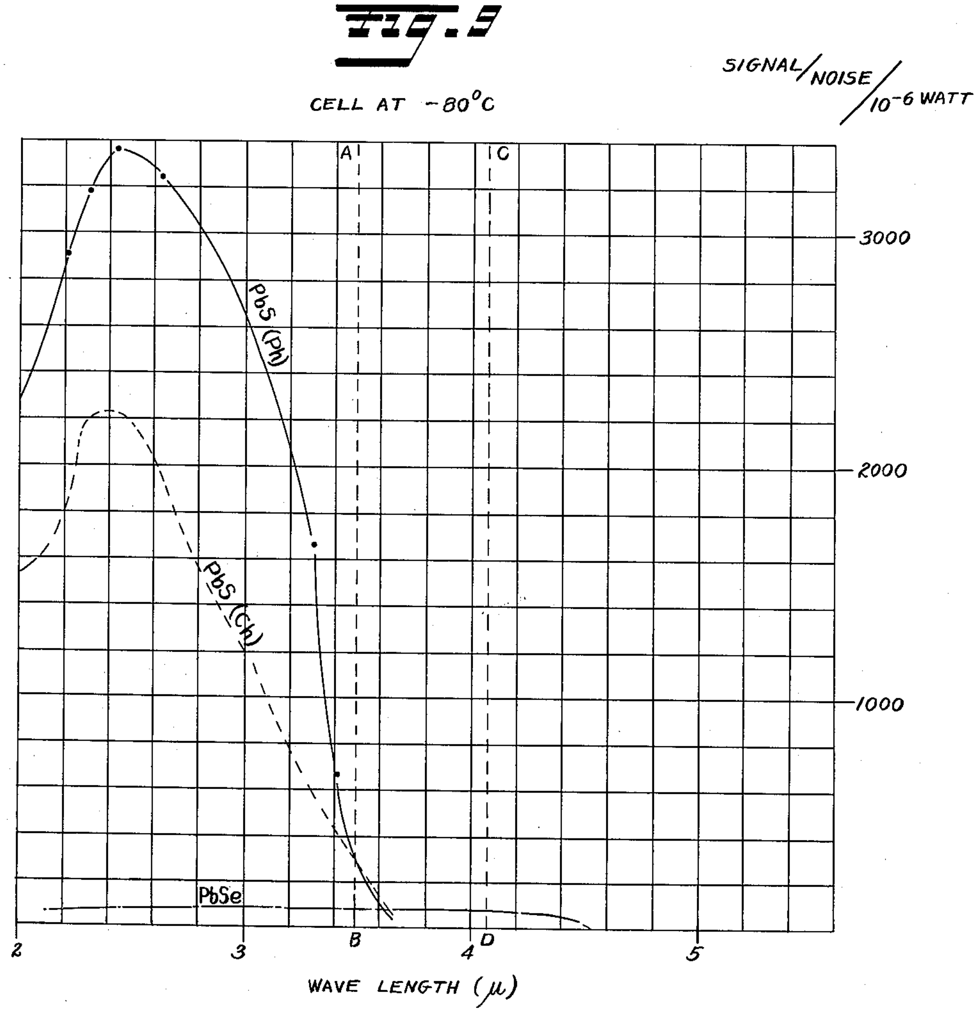

About 5–7 milligrams (depending on the cell size) of lead sulfide powder, which preferably has been prepared in the manner described above, is passed into the chamber 32 of the cell body, through the tube 30, and is initially in zone 1, indicated in FIGURES 6 and 7. The chamber 32 is now evacuated down to a pressure of $10^{-5}$ or $10^{-6}$ mm. of mercury. The lead sulfide is next transferred from zone 1 to zone 2, indicated on FIGURE 6, by sublimation. To effect this transfer, the cell is placed in a small oven as shown in FIGURE 7. The temperature of the oven in the region A should have a minimum value of 580 degrees centigrade, while the temperature in region B should not exceed 550 degrees centigrade.

The lead sulfide now at zone 2 is oxidized by introducing oxygen while the temperatures in region B are still about 550° C. The amount of oxygen used is such that from 1–50% of the lead sulfide deposited on the area between the electrodes is oxidized. Approximately 30% oxidation of the lead sulfide layer is preferable. The amount of oxygen used is determined by calculating the oxygen required to oxidize approximately 30% of the lead sulfide in the cell envelope and proceeding as follows:

The volume of the vacuum device used in the cell manufacturing procedure is determined and a measured amount of oxygen is introduced into the system. The resulting pressure of the oxygen in the vacuum device is recorded. The reaction between the oxygen and the lead sulfide in the cell will cause a change in the pressure of the oxygen in the vacuum unit. The oxidation procedure is allowed to proceed until the change of pressure in the system indicates that a sufficient amount of oxygen has reacted with the lead sulfide, so that approximately 30% of the lead sulfide has been oxidized and optimum sensitivity results.

The oven 40 of FIGURE 7 may be in the form of a tube 42, upon which is placed a first heating coil 44 of suitable wire to produce the temperature desired in region A, and a second heating coil 46, is disposed about the tube to produce the temperature desired in region B. Suitable independent thermocouple means, such as indicated at 48, are inserted into the oven from each end so that the operator may observe the temperature in each region. Conventional means may be employed to automatically control current flow to the heaters to maintain the temperatures at the desired values.

The oven may be provided with suitable means 50 to position the cell radially within the oven.

When the control tests which will be described in detail hereinafter, indicate that the oxidation procedure should be terminated, the cell is again evacuated down to $10^{-5}$ or $10^{-6}$ mm. and the cell envelope is heated so that all of the sublimated lead sulfide remaining around the inside of the envelope is transferred to zone 2. The desired portion of the envelope may be heated by a hand held gas burner or by the proper disposition of the cell in the oven. The next step is to heat the envelope so that the lead sulfide is transferred by sublimation from zone 2 to zone 3, indicated in FIGURES 6 and 7. During this transfer of the material, the temperature of zone 3 should be higher than 100° C. to prevent simultaneous condensation of sulfur vapor. A temperature of 150° C. has been found satisfactory especially for photocells to be sensitive at room temperature. At the completion of this transfer, the effective lead sulfide will be on the area defined between the electrodes 26 and in conductive connection with those electrodes. Oxygen is again introduced into the cell at a pressure of 0.2 mm. The cell is again placed in the oven, and its temperature is raised until the temperature in zone 2 is 500 degrees centigrade and the temperature at zone 3 is at or below 400 degrees centigrade. The cell is maintained at these temperatures, and with the difference of temperature given above, for about one half minute to five minutes, depending on the size and shape of the cell. The cell is then cooled rapidly to room temperature by interrupting the current to the heating coils and by directing a blast of cold air internally of thimble 24 and against the upper end of the thimble to cool the layer of radiation sensitive material now in zone 3.

After the cell has been cooled to room temperature, it is then evacuated down to $10^{-5}$ or $10^{-6}$ mm. and its resistivity is measured. The dark current for one volt applied to the cell may be approximately 100 microamperes as a maximum. The photo-current is then measured when the cell is irradiated for example by a black body radiator operating at a temperature of 300 degrees centigrade, and having an emitting orifice of one centimeter square, and placed at a distance of approximately 27 mm. from the cell. The photocurrent (total current less dark current) should then, in this example, be more than three microamperes.

If the results of this testing procedure indicate that the cell is satisfactory, the cell is completed by flame sealing the capillary tube 30, close to the base of the cell. If the tests indicate that the cell has not met the standards for light and dark currents, the cell is evacuated to $10^{-5}$–$10^{-6}$ mm. and heated at 200° C. for 1–2 minutes, immediately cooled and retested. This procedure can be repeated again if the dark currents still are not satisfactory. The above procedure increases the resistance of the cell, so that optimum characteristics will result.

Moisture must be excluded at all steps for, while moisture may make the photo-sensitive material more sensitive under certain conditions, it makes the operation of the cell unpredictable.

Figure 8:
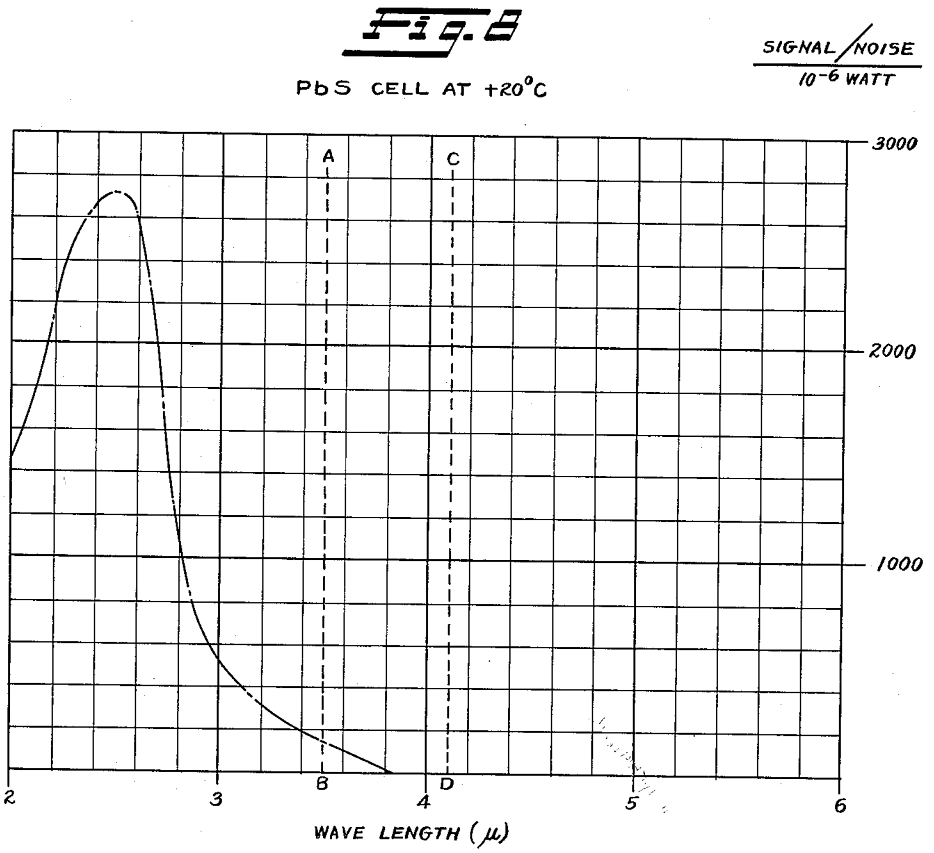
FIGURE 8 shows, by way of curves, the spectral response of an evaporated lead sulfide photocell operating at room temperature.

FIGURE 8 shows, by way of a curve, the spectral response of a typical photocell produced by the method disclosed in our said copending application and described above. The measurements from which the curve of FIGURE 8 was plotted were taken with the cell at room temperature (20° C.). A black body radiator at 300° C. was used as the infra-red source, and a rock salt prism monochrometer with an exit slot of 0.32 mm., effective to pass a wavelength band 0.2 micron ±30% in width, was used with the infra-red source. The radiation impinging on the cell under test was pulsed by a chopping disc at 400 cycles per second. A broad band amplifier having a bandpass of 50–5000 cycles per second was employed for measurement of the output response of the cell.

As is apparent from FIGURE 8, the output response of photocells of this type when operated at room temperature is peaked at about 2.5 microns and falls rather sharply to relatively low values at wavelengths within the 3.5–4.1 micron atmospheric window (indicated by dotted lines AB and CD in FIGURE 8). We have found that the spectral response characteristics of cells of this type may be shifted by cooling the cells, and that if such cells are cooled to temperatures of the order of −180° C., which is approximately that of liquid air, their spectral response will be shifted so as to extend to wavelengths within the 3.5–4.1 micron range of optimum atmospheric transparency.

Figure 10:
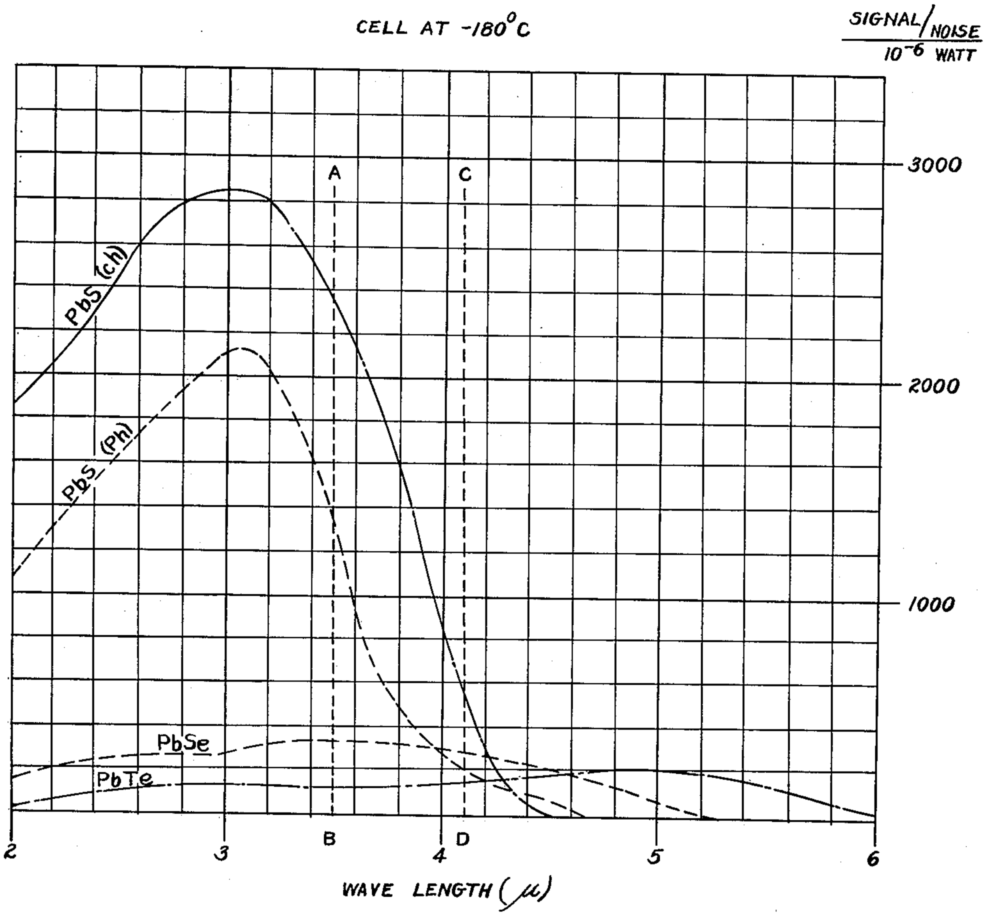
FIGURE 10 shows, by way of curves, the spectral response of a chemically produced lead sulfide photocell, an evaporated lead sulfide photocell, a lead telluride cell and a lead selenide cell at —180° C.

FIGURES 9 and 10 illustrate this shift in spectral response, FIGURE 9 showing spectral response at −80° C. cell temperatures and FIGURE 10 showing response at −180° C. cell temperatures. The atmospheric "window" of optimum transparency is represented on the graphs of FIGURES 9 and 10 by dotted lines AB and CD at 3.5 and 4.1 microns, respectively.

For purposes of comparison, the graphs of FIGURES 9 and 10 show not only the spectral response of an evaporated or "physical" layer type photo-cell such as described above, the response curve of which is designated PbS(Ph) in these graphs, but also spectral response curves for lead selenide, lead telluride and chemically deposited lead sulfide type photocells, the curves for these different cells being designated PbSe, PbTe and PbS(Ch), respectively, in FIGURES 9 and 10. The lead telluride cells used in these measurements were fabricated by the methods disclosed in our copending application Serial No. 395,168 filed June 8, 1954. The chemically deposited lead sulfide cells were made by precipitating lead sulfide on a glass base in accordance with the reaction:

$$CS(NH_2)_2+Pb(CHCOO)_2+4NaOH \rightarrow PbS+NCN(Na)_2+2CH_3COONa+4H_2O$$

The resulting lead sulfide layer was then baked at 150° C.

The graphs of FIGURES 9 and 10 illustrate quite clearly that the cooled lead sulfide cell produced either by chemical precipitation or by evaporation has the highest spectral sensitivity at the atmospheric "window" between 3.5–4.1 microns and thus is best suited for use in infra-red detection devices operating in the atmosphere.

Because of the difficulty in controlling side reactions in the manufacture of chemical lead sulfide cells, we prefer to utilize the lead sulfide evaporation techniques for production of photoconductive cells so as to simplify manufacturing procedures. As is readily apparent from FIGURES 9 and 10, however, the spectral response shift obtained by cell cooling is much more pronounced in the case of chemically deposited photosensitive layers than in the case of evaporated layers, and the magnitude of output response is also greater for the chemically deposited cells at least at wavelengths with the 3.5–4.1 micron "window."

We have found that the advantages of the chemically deposited layer type cell may also be obtained in evaporated layer cells by modifying the lead sulfide evaporation and sensitization techniques employed in fabricating the cells. It thus is possible to produce cells which combine the more pronounced spectral response shift of the chemical layer type with the greater ease of manufacture of the physical layer type. The methods used for production of such cells are broadly similar to those described above, but differ therefrom in the techniques used in evaporating and sensitizing the lead sulfide photosensitive layer. A cell produced by such modified method is illustrated in FIGURE 11.

Figure 11:
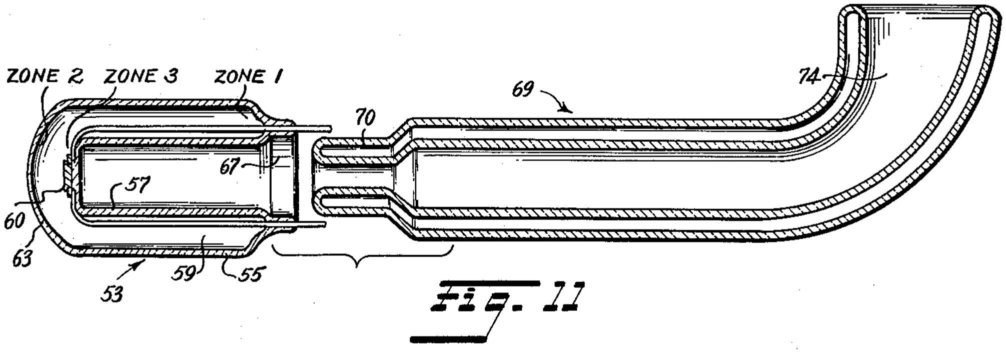
FIGURE 11 is a sectional view of a modified form of photocell and of an assembly for cooling either this photocell or that of FIGURE 6.

The cell 53 of FIGURE 11 is fabricated in steps of providing a cell envelope, electrode and lead wire assembly generally similar to that of FIGURE 6. The outer envelope 55 and thimble 57, which define a generally annular chamber 59 therebetween, are fabricated of a suitable glass such as the sodium borate glass known as "Duran" and manufactured by the Shott Glass Company in Germany. The lead sulfide photosensitive layer 60 is produced within the cell as follows:

About 5–7 milligrams (depending on the cell size) of lead sulfide powder which preferably has been prepared and dried in the manner described above, is passed into chamber 59 of the cell body through a small tube (not shown) similar to tube 30 in FIGURE 6, and is initially in zone 1 indicated in FIGURE 11. The chamber 59 is now evacuated down to a pressure of about $10^{-5}$ or $10^{-6}$ mm. of mercury, and the lead sulfide then transferred from zone 1 to zone 2 (FIGURE 11) by sublimation. To effect this transfer the cell is placed in a small oven similar to that shown in FIGURE 7. The temperature of the oven in region A (FIGURE 7) should have a minimum value of 580° C., while the temperature in region B should not exceed 550° C.

Oxygen is then introduced so that the chamber 59 is at a pressure of $10^{-2}$ or $10^{-3}$ mm., and the sulfide then transferred from zone 2 to zone 3 by sublimation. While maintaining pressure at $10^{-2}$ or $10^{-3}$ mm., the lead sulfide layer now between the electrodes is heated to 250° C. for from 10 to 60 minutes. The cell is then cooled to room temperature, chamber 59 is evacuated to about $10^{-6}$ mm. and the cell completed by flame sealing the exhaust tube close to the base of the cell.

The resulting lead sulfide cell will be but slightly photosensitive at room temperature because of its low dark resistance. When cooled to −180° C. with liquid air, it will have approximately the same dark resistance, sensitivity and spectral response as the chemical layer cells. The procedures described hereinabove, however, will produce cells with better reproducibility of characteristics than those presently obtainable by chemical methods.

The photocell of FIGURE 11 also differs from that of FIGURE 6 in the structure of its window 63. This window consists of a thin, outwardly convex glass sphere segment transparent to radiation within the range of response of the photosensitive layer of the photocell. Other groups have reported the construction of infra-red sensitive cells employing lead sulfide photosensitive areas, but have found it necessary to construct such units with sapphire (aluminum oxide) windows to permit the transmission of infra-red radiation of wavelengths up to 6 microns. These sapphire windows are very expensive, and only small windows can be made because of the difficulty in preparing the material. With such small windows it often is impossible to collect the total infra-red radiation.

We have found that thin glass windows about 50 microns thick will also permit the transmission of infra-red radiation to 6 microns. In order to enable such thin windows to resist the possibility of breakage due to atmospheric pressure, they preferably are made outwardly convex in shape. This convexity of the extremely thin window admits a solid angle of about 90° and at the same time increases the resistance to breakage. By properly gauging the thickness and curvature of the cell windows, it is possible to produce cells allowing 60% transmission of infra-red radiation from 5 to 6 microns.

In order that lead sulfide photocells produced by either of the methods described above operate satisfactorily, it usually is necessary to provide cooling devices for lowering the temperature of their photosensitive layers to approximately that of liquid air (about −180° C.). It is important that these devices be small in size, yet with sufficient cooling capacity to allow relatively long time operation at the desired temperature.

In FIGURE 11 there is shown one means for holding the lead sulfide cell at low temperature. The cell 53 has a portion of the wall of the thimble 57 thereof treated to present a ground surface as indicated at 67. A body 69 of double wall construction, as in the familiar Dewar flask in which the inner sides of the two walls are silvered and there is a vacuum in the space therebetween, has a shank portion 70 treated to present a ground glass surface which may be inserted into the thimble 57, to make a tight fit with the surrounding ground glass portion thereof. The body 69 also has a bowl portion 74 communicating with the shank, and when liquid air is poured into the bowl it flows into the interior of the thimble to hold the radiation sensitive material 60 at the desired low temperature. When the body 69 and the communicating interior of the thimble are filled with about 200 cc. of liquid air, the cell will operate at a temperature of approximately −180° C. for about one hour before it becomes necessary to recharge the device with liquid air.

The photosensitivity and spectral response shift of cells produced by either of the methods described above is directly related to the dark resistance thereof. For best operation, the cells should have a dark resistance between $10^4$ and $10^5$ ohms at room temperature (i.e., at about 20° C.) and a dark resistance of about $10^6$ ohms when cooled to the temperature of liquid air. Thus, dark current at room temperature and with an applied voltage of one volt should be between 10 and 100 microamps; dark current at −180° C. should be of the order of one microamp.

Figure 12:
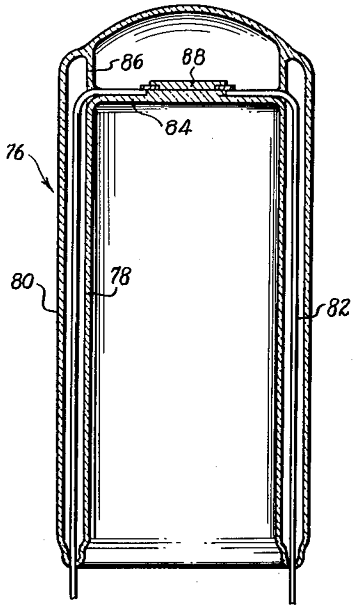
FIGURE 12 is a sectional view of another modified form of cooled photocell.

FIGURE 12 shows a complete infra-red responsive cell 76 designed to minimize the amount of extraneous infra-red radiation, due to ambient temperature, which impinges on the photosensitive surface of the cell. This is accomplished by decreasing the angle of receptivity of the cell and by cooling the portion of the cell wall structure "viewed" by the photosensitive layer.

A suitable glass, such as the "Duran" glass referred to above, is used for cell construction. The cell is composed of an inner tubular envelope 78 and an outer envelope 80 integrally connected with the envelope 78 to define a chamber 82 between said envelopes, the interior walls of the chamber preferably being silvered and the chamber evacuated to heat insulate the inner envelope 78. The envelope 78 is made by fusing a plate 84 to the inside of a glass cylinder 86 so that the end portion of the cylinder extends beyond the plate. Liquid air placed inside cylinder 86 will cool the radiation sensitive lead sulfide area 88 to about −180° C. for maximum sensitivity at the area of atmospheric transparency between 3.5 and 4.2 microns. The portion of the tube extending beyond the plate 84 will, by thermal conductivity, cool the portion of the cell not normally cooled by the liquid air in the thimble, thus minimizing the impingement of infra-red ambient radiation which normally would produce noise in the cell. We have observed that a limited band of optic detection is in most cases better than a broad one particularly if the detector is close to the object being detected.

Because the cooled lead sulfide cells described above have a spectral response at the point of maximum atmospheric infra-red transmission, they can be employed for ship to ship, plane to plane, ship to plane, or ship to shore communication or detection. They are especially satisfactory for use as ship to ship communication or detection devices because of their high sensitivity in the atmospheric "window" between 3.5 and 4.1 microns. The high moisture content of the atmosphere at sea makes the presence of this "window" and the matching of the detector response characteristics thereto critical to the reception and indication of infra-red radiation by detection devices.

The devices of this invention can also be used in guided missiles for detecting the presence of an aircraft or other target so that the missile may be exploded at the proper moment. FIGURE 13 shows, schematically, a missile of this type. In FIGURE 13 the guided missile 90 carries a tube 92 in which is mounted a lead sulfide infra-red responsive cell 94 coupled by its lead wires 96 through a conventional amplifier 98 to missile control means indicated generally at 100.

FIGURE 14 shows, by way of curves, the output response of a lead telluride cell and of a typical lead sulfide cell when employed in a device such as shown in FIGURE 13 and used for detection of a relatively cool (55° C.) body which may be distantly spaced in the atmosphere. The data from which the curves of FIGURE 14 were plotted was taken with both cells operating at a temperature of −180° C. Lines AB and CD in FIGURE 14 designate the atmospheric "window" between 3.5 and 4.1 microns. Again it can be observed that the lead sulfide cell has a much higher response than lead telluride at the atmospheric "window," which makes it best suited for guided missiles and other detection devices operating in the atmosphere, particularly where the atmosphere contains relatively high concentrations of moisture and/or carbon dioxide and therefore absorbs substantially all infra-red radiation not of a wavelength falling within such an atmospheric "window."

When used in devices which operate at high altitudes such as the guided missile schematically illustrated in FIGURE 13, the lead sulfide cells may in some cases be adequately cooled merely by exposure to the low ambient temperature characteristic of such altitudes. By slightly varying the temperatures and pressures utilized in the various steps of the cell production methods described above it is possible to produce cells having dark resistances such as to enable the cells to be satisfactorily used in the 3.5 to 4.1 micron range even though not cooled to liquid air temperatures but only to the low temperatures found in the upper atmosphere.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An infra-red sensitive photoconductive cell comprising a first tubular envelope disposed in at least partially telescoped relation surrounding a second tubular envelope with one end of said first envelope closed by a window substantially transparent to infra-red and the other end of said first envelope sealed to said second envelope; a disc member sealingly mounted in said second tubular envelope intermediate the ends of said first envelope to form a closed chamber defined by said first and second tubular envelopes, said window and said disc member; photosensitive material in said chamber on the surface of said disc member facing said window; electrodes carried by said disc member conductively connected to said photosensitive material and having end portions extending to the exterior of said photoconductive cell for connection to electrical circuit apparatus; the space between said first and second tubular envelopes being evacuated to minimize heat interchange between the inner and outer envelopes; a hollow body having a portion thereof removably secured in the other end of said first tubular envelope and arranged cooperable therewith to define a reservoir for a liquid cooling medium effective to lower the temperature of said photosensitive material below 0° C.

2. A photocell comprising an outer tubular envelope, an inner tubular wall member forming an upstanding thimble having a closed end and an open end in said envelope, said open end being sealed to said outer envelope in such manner that an evacuated chamber is provided; electrodes carried by said thimble inside said chamber and having end portions extending to the exterior of said photocell for connection to electrical circuit apparatus; photosensitive material on the closed end of said thimble inside said evacuated chamber and in conductive contacting relation with said electrodes; a hollow body having heat insulated walls with a neck portion thereof removably secured in the open end of said thimble and a reservoir for containing liquid air.

3. A photocell comprising an outer envelope; a tubular wall member upstanding in said envelope, said tubular wall member being closed adjacent one end by a disc member and open at the other end, said open end being sealed to said outer envelope in such manner that an evacuated chamber is provided between the tubular member and the envelope; electrodes carried by said disc member inside said chamber and having end portions extending to the exterior of said photocell for connection to electrical circuit apparatus; photosensitive material on an inner surface of said disc member inside said evacuated chamber and in conductive contacting relation with said electrodes; and a vessel having hollow walls defining a reservoir for a liquid cooling medium, and a shank portion received in the open end of said tubular wall member to supply a cooling medium adapted to be stored in said reservoir to the interior of said upstanding tubular wall member.

4. A photocell comprising an outer envelope; an upstanding wall member forming a thimble having a closed end and an open end in said envelope; said open end being sealed to said outer envelope in such manner that an evacuated chamber is provided; electrodes extending along said thimble inside said chamber and having end portions extending to the exterior of said photocell for connection to electrical circuit apparatus; photosensitive material on the closed end of said thimble inside said chamber and in conductive contacting relation with said electrodes; and a vessel having hollow walls defining a reservoir for a cooling medium and a shank portion received in the open end of said thimble to supply cooling medium adapted to be stored in said reservoir to the interior of said thimble.

References Cited in the file of this patent

UNITED STATES PATENTS

| | | |
|---|---|---|
| 2,189,122 | Andrews | Feb. 6, 1940 |
| 2,448,516 | Cashman | Sept. 7, 1948 |
| 2,480,711 | Calton | Aug. 30, 1949 |
| 2,544,261 | Gibson | Mar. 6, 1951 |
| 2,547,173 | Rittner | Apr. 3, 1951 |

OTHER REFERENCES

The Proceedings of the Physical Society, Wilman, vol. 60, Part 2, No. 338, February 1, 1948, pp. 117–132. (Pp. 125, 126 and 129 relied on.)

The Proceedings of the Physical Society, Moss, Vol. 62B, No. 359B, November 1, 1949, pp. 741–748. (Page 743 relied on.)

The Proceedings of the Physical Society, Chasman et al., Vol. 64B, No. 379B, July 1, 1951, pp. 562–602. (Page 596 relied on.)

Research, Milner et al., Vol. 5, No. 6, June 1952, pp. 267–273. (P. 267 relied on.)

Research, Moss, Vol. 6, No. 7, July 1953, pp. 258–264. (Page 259 relied on.)

Philosophical Magazine Supplement, Vol. 2, No. 7, July 1953, pp. 321–369. (Pages 327–339 relied on.)